United States Patent [19]

Kjellqvist

[11] Patent Number: 5,472,285
[45] Date of Patent: Dec. 5, 1995

[54] APPARATUS FOR REFINING FIBER MATERIAL

[75] Inventor: Olof Kjellqvist, Sundsvall, Sweden

[73] Assignee: Sunds Defibrator Industries Aktiebolag, Sweden

[21] Appl. No.: 331,652

[22] PCT Filed: Apr. 21, 1993

[86] PCT No.: PCT/SE93/00344

§ 371 Date: Nov. 8, 1994

§ 102(e) Date: Nov. 8, 1994

[87] PCT Pub. No.: WO93/23166

PCT Pub. Date: Nov. 25, 1993

[30] Foreign Application Priority Data

May 8, 1992 [SE] Sweden ................... 9201448-9

[51] Int. Cl.⁶ ................................ F16C 19/38
[52] U.S. Cl. ................ 384/556; 384/563; 384/99
[58] Field of Search .................. 384/556, 563, 384/99, 571, 517; 241/37

[56] References Cited

U.S. PATENT DOCUMENTS

| | | | |
|---|---|---|---|
| 2,565,759 | 8/1951 | Danley et al. | 384/556 |
| 3,304,139 | 2/1967 | Toth et al. | 384/556 |
| 4,341,426 | 7/1982 | Clapp | 384/556 |
| 4,923,313 | 5/1989 | Bergling. | |
| 5,323,972 | 6/1994 | Kjellqvist | 384/121 |

FOREIGN PATENT DOCUMENTS

345892   6/1972   Sweden.

*Primary Examiner*—Lenard A. Footland
*Attorney, Agent, or Firm*—Lerner, David, Littenberg, Krumholz & Mentlik

[57] ABSTRACT

Apparatus for refining fibrous material comprising first and second opposed refining disks, at least one of said first and second opposed refining disks being rotatable, a rotary shaft for rotatably mounting said at least one of said first and second opposed refining disks, a bearing housing for mounting said rotary shaft, a stand for stationary mounting of said bearing housing, said bearing housing including first and second bearings supporting said rotary shaft, said first bearing for at least carrying axial forces from said at least one of said first and second opposed refining disks and said second bearing for at least carrying radial forces therein, first and second bearing seats axially movable within said bearing housing, each of said first and second bearings being rigidly mounted in said first and second bearing seats, and prestressing structure mounted between said first and second bearing seats.

11 Claims, 3 Drawing Sheets

APPARATUS FOR REFINING FIBER MATERIAL

This invention relates to an apparatus for the refining of fiber material. The apparatus, a so-called disk refiner, comprises two opposed refining disks, at least one of which is rotary and supported on a rotary shaft. In a disk refiner of said type, the shaft is mounted in a stand via a bearing housing comprising at least two bearings, one of which is an axial/radial bearing for carrying axial forces from the refiner disk as well as prevailing radial forces, and one is an axial/radial bearing intended primarily to carry radial forces.

A disk refiner equipped with such a bearing type is disclosed in SE-PS 345 892. The bearing is relatively complicated, because it comprises a bearing housing for the bearings which is axially movable in the refiner stand. The bearing housing there must be extensive in length and include several slide surfaces to be fitted into the stand. The bearings, furthermore, must be axially prestressed in such a way, that at least one bearing must carry radial load and simultaneously must be axially movable in the bearing housing. This compromise renders a complicated and more expensive structure and deteriorates its functional efficiency.

The present invention offers a solution of the aforesaid problems. Due to the bearing housing being fixed in the stand, and the bearings rigidly mounted each in its axially movable bearing seat, and prestressing members arranged between the bearing seats, a simple and operationally reliable structure is obtained. The characterizing features of the invention are apparent from the attached claims.

The invention is described in greater detail in the following, with reference to the accompanying drawings showing different embodiments of the invention.

Figure 1:
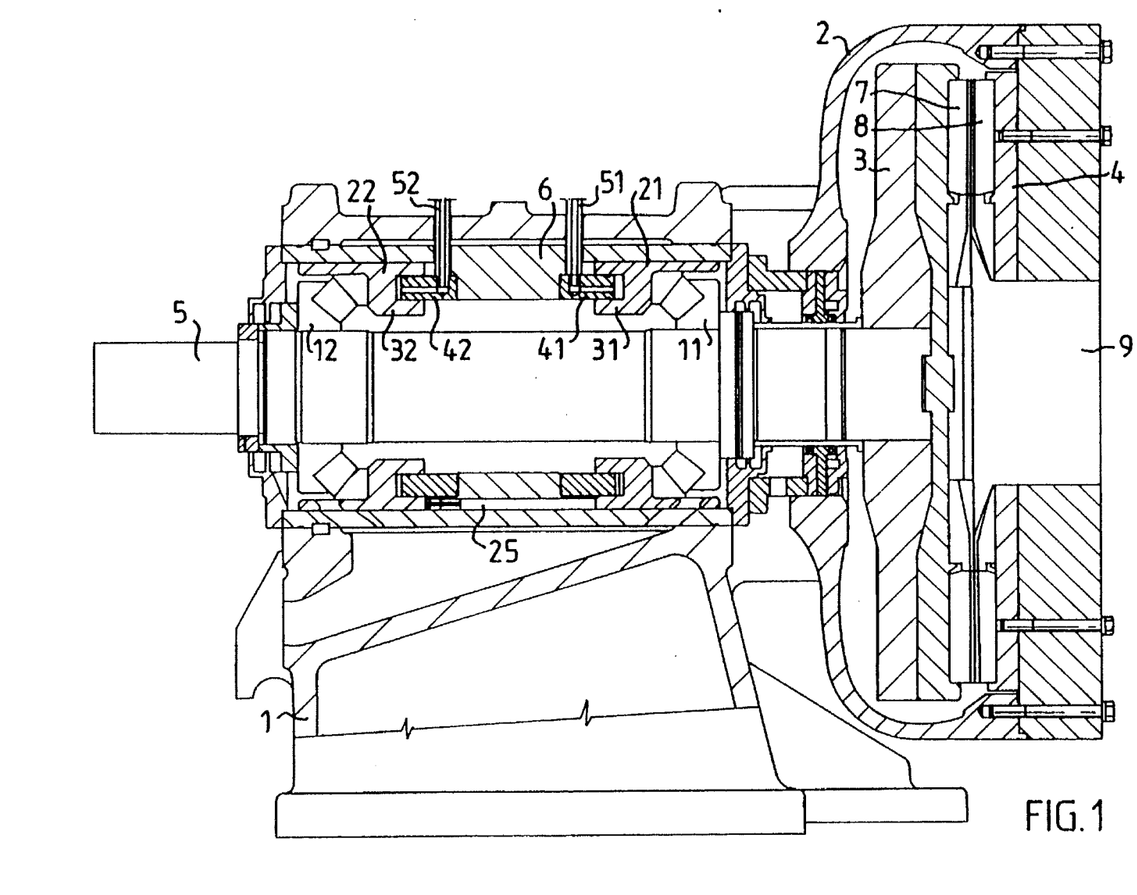
FIG. 1 is a side, elevational, cross-sectional view of one embodiment of the apparatus of the present invention.
Figure 2:
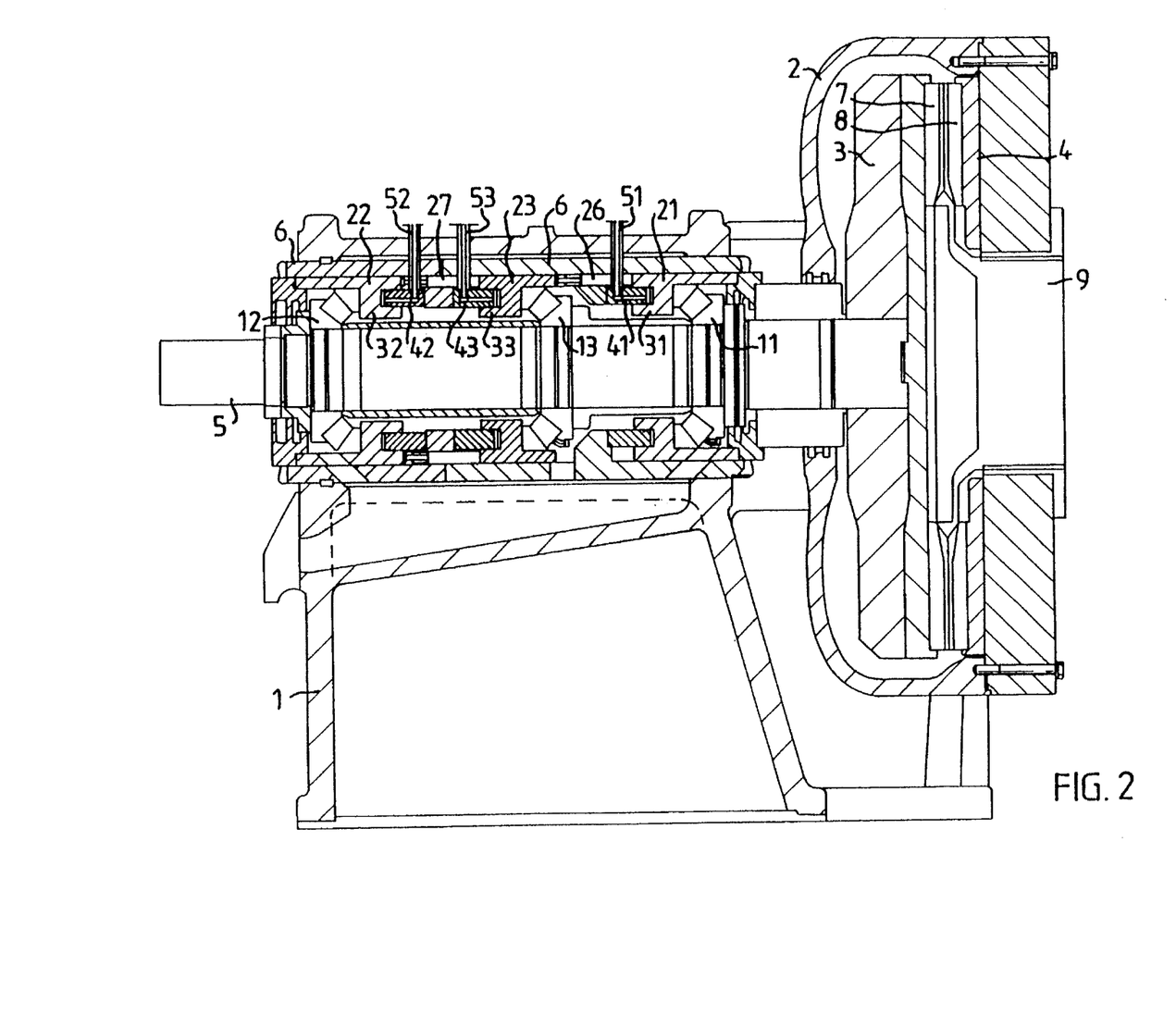
FIG. 2 is a side, elevational, cross-sectional view of another embodiment of the apparatus of the present invention.

FIGS. 1 and, respectively, 2 are cross-sections of embodiments comprising two and, respectively, three bearings.

Figure 3:
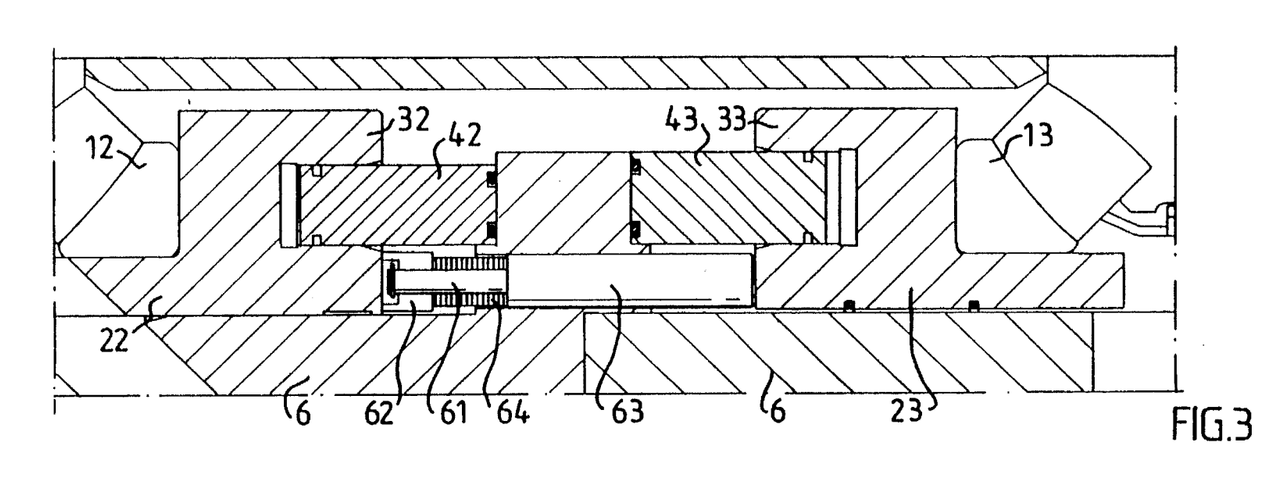
FIG. 3 is an enlarged, partially sectional view of a portion of the apparatus shown in FIG. 2.
Figure 4:
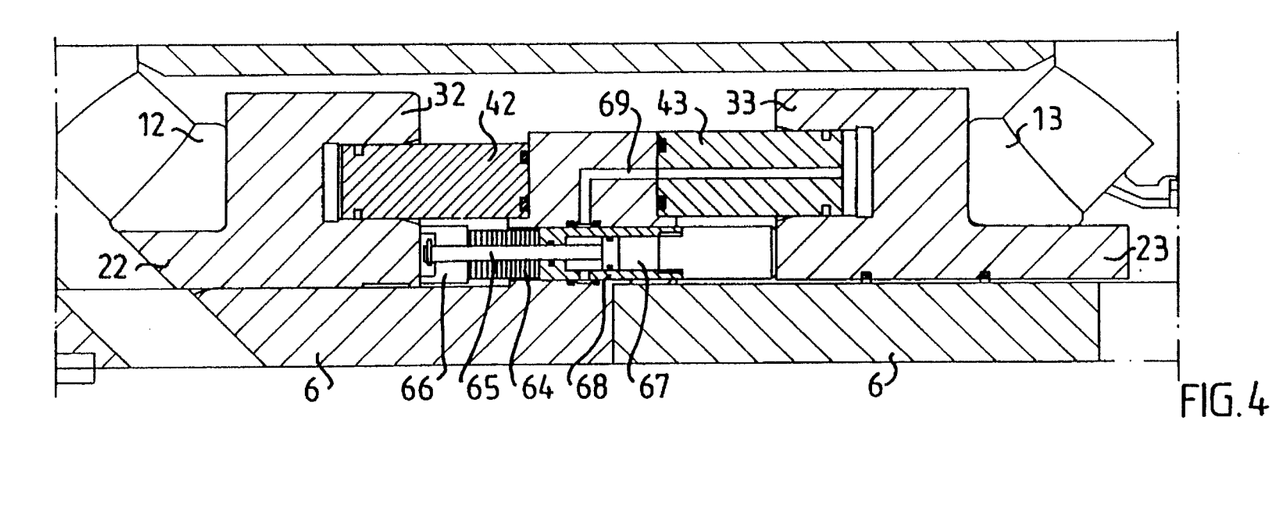
FIG. 4 is another embodiment of another version of a portion of the apparatus shown in FIG. 2.

FIGS. 3 and 4 are cross-sections of a detail in FIG. 2 of different designs.

Both embodiments consist of a refiner with a stand 1 and a refiner housing 2, in which two opposed refining disks 3,4 are located. At these embodiments, a first refining disk 3 is rotary, and a second one 4 is stationary. The rotary refining disk 3 is supported on a rotary shaft 5, which is mounted in the stand 1 via a bearing housing 6 and driven by a motor (not shown).

The refining disks 3,4 are provided on their surfaces facing toward each other with refining elements 7,8, which between themselves define a refining gap. The stationary refining disk 4 has a central inlet opening 9, through which the material is fed in which is to be refined during its passage outward through the refining gap.

During the refining operation, a very high pressure is generated in the refining gap, which pressure yields an axial force which has to be carried by the bearing of the shaft. This force can amount to several tens of tons and, therefore, puts very high requirements on the bearing design.

The rotary shaft 5 also is movable so as to allow adjustment of the refining gap between the refining elements 7,8 on the refining disks 3,4.

According to the embodiment shown in FIG. 1, the shaft 5 is supported by two bearings 11,12. The first bearing 11 is an axial/radial bearing intended to carry axial forces from the first refining disk 3. This bearing 11 also shall carry prevailing radial forces, for example the dead weight of the shaft and refining disk. The second bearing 12 is an axial/radial bearing intended primarily to carry radial forces, for example counter forces to the radial forces on the first bearing.

The bearing housing 6 is mounted rigidly in the stand 1. The two bearings 11,12 are attached with their inner ring on the shaft 5 and with their outer ring are fixed in a first and, respectively, second bearing seat 21,22. These bearing seats are axially movable by means of slip fit, but not rotary in the bearing housing 6. In the stationary bearing housing 6, a plurality of first prestressing members 25 are arranged between the two bearing seats 21,22. Each prestressing member 25 preferably is designed as a spring-loaded piston/cylinder unit, the object of which is to keep apart the bearing seats 21,22 so as to prevent play.

The axial movement of the bearing seats 21,22 is controlled by a first and, respectively, second ring piston 41,42, which are rigidly connected to the bearing housing 6 and thereby co-operate with a first and, respectively, second annular hydraulic cylinder 31,32 in the first and, respectively, second bearing seat 21,22. The first ring piston/ring cylinder unit 41,31 is intended to move the first bearing seat 21 so as to reduce the refining gap. This implies, that the axial forces generated in the refining gap are to be taken up via the first ring piston/ring cylinder unit 41,31. The second ring piston/ring cylinder unit 42,32 is intended to act in the opposite direction and, thus, is utilized when the refining disks are to be pulled apart.

A first and, respectively, second conduit 51,52 for hydraulic medium are arranged for operating the two ring piston/ring cylinder units 41,42, 31,32. Said conduits extend through the stand 1 via the bearing housing 6 and respective ring piston 41,42 to respective ring cylinder 31,32.

Owing to this design, the two bearing seats 21,22 with associated bearings 11,12 can rapidly and safely be operated as one unit by means of the hydraulic medium in the two conduits 51,52. Simultaneously, the axial forces from the first refining disk 3 are transferred through the bearing 11 and bearing seat 21 to the stationary bearing housing 6.

The embodiment according to FIG. 2 agrees in principle with FIG. 1. A distinguishing feature is that the shaft 5 is supported on three bearings 11,12,13. The first bearing 11 is an axial/radial bearing intended to carry part of the axial forces from the first refining disk 3. As in the case of the first embodiment, the bearing 41 shall carry also prevailing radial forces. The second bearing 12 is an axial/radial bearing intended primarily to carry radial forces. The third bearing 43 is located between the two firstmentioned bearings and arranged to carry only axial forces. The bearing 13, however, preferably is an axial/radial bearing.

The third bearing 13 is attached with its inner ring on the shaft 5 and with its outer ring secured in a third bearing seat 23. This third bearing seat 23 is axially movable with a certain play in the bearing housing 6. According to this embodiment, a plurality of second and, respectively, third prestressing members 26,27 are located between the first and third bearing seat 21,23 and, respectively, between the second and third bearing seat 22,23. The prestressing members preferably are designed as spring-loaded piston/cylinder units and capable to keep the bearing seats 21,22,23 apart from each in order to avoid play. The collective force from the third prestressing members 27 shall exceed the collective force from the second prestressing members 26.

The third bearing seat 23 is formed with a third annular hydraulic cylinder 33, which co-operates with a third ring piston 43 rigidly connected with the bearing housing 6. The third ring piston/ring cylinder 43,33 is moved by means of a hydraulic medium via a third supply conduit 53. The third ring piston/ring cylinder unit 43,33 further is arranged to co-operate with the first ring piston/ring cylinder unit 41,31 in order to take up axial forces from the first refining disk 3.

The distribution of the axial forces from the first and third bearing 11,13 is determined by the ratio between the areas in the first and third ring cylinder 31,33 by maintaining the same pressure in the respective conduit 51,53. The load distribution then is directly proportional to the area ratio. The third bearing 13 does not carry any radial forces, because the bearing seat 23 is located with play in the bearing housing 6. As the first bearing 11 carries also radial forces, it may be suitable to design the third ring cylinder 33 with a slightly greater area than the first ring cylinder 31, so that the axial load on the third bearing is slightly greater.

It is, of course, possible to arrange additional bearings between the first and second bearing 11,12. These additional bearings with associated bearing seats then, like the third bearing, shall carry only axial forces, which are distributed in proportion to the area of the respective ring piston/ring cylinder unit. Prestressing members between the bearing seats are arranged as described above.

The bearing detail according to FIG. 2 shown in FIG. 3 comprises the two bearing seats 22,23 and one prestressing member 27. According to this embodiment, the prestressing members 27 are formed with a piston/piston rod 61, the rear end 62 of which abuts the bearing seat 22, and its forward end is axially movable in a cylinder 63. Between the rear end 62 of the piston rod and the cylinder 63, a prestressed spring package 64 is located which tends to press apart the piston/piston rod 61 and cylinder 63, and therewith also the bearing seats 22 and 23, so that play in the bearings 12,13 is avoided. The remaining prestressing members 25,26 are designed and operate correspondingly. This operational function is essential when the first refining disk 3 is moved axially towards the second refining disk 4 for adjusting the refining gap before the production is started, because the pressure in the ring cylinders 31,33 then is very low.

At the start of the production, the pressure in the ring cylinders 31,33 increases in order to counteract the axial forces generated in the refining gap as described above. The prestressing members 25,26,27 in this phase deliver only a minor force to the second (rear) bearing 12. It is, therefore, possible to arrange a relief of at least some of the prestressing members 25,26,27 in each group. In FIG. 4 is shown how such a relief can be provided. FIG. 4 shows the same detail of the bearing as in FIG. 3, but the prestressing member 27 is designed differently. A piston rod 65 abuts the bearing seat 22 with its rear end 66. The forward end of the piston rod is formed with a piston 67, which is axially movable in a cylinder 68. Between the rear end 66 of the piston rod and the cylinder 68, a prestressed spring package 64 is located. The cylinder 68 communicates via a channel 69 with the space in the ring cylinder 33 in front of the ring piston 43. At increasing pressure in the ring cylinder 33, the pressure in the cylinder 68 increases simultaneously and thereby counteracts the force of the spring package 64. The remaining prestressing members 25,26, of course, can be designed in a corresponding manner, thereby avoiding unnecessary axial load on the bearings during operation. As regards the embodiment according to FIG. 2, the collective force from the prestressing members 27 all the time shall exceed the collective force from the prestressing members 26.

The invention, of course, is not restricted to the embodiments shown, but can be varied within the scope of the invention idea.

I claim:

1. Apparatus for refining fibrous material comprising first and second opposed refining disks, at least one of said first and second opposed refining disks being rotatable, a rotary shaft for rotatably mounting said at least one of said first and second opposed refining disks, a bearing housing for mounting said rotary shaft, a stand for stationary mounting of said bearing housing, said bearing housing including first and second bearings supporting said rotary shaft, said first bearing for at least carrying axial forces from said at least one of said first and second opposed refining disks and said second bearing for at least carrying radial forces therein, first and second bearing seats axially movable within said bearing housing, each of said first and second bearings being rigidly mounted in said first and second bearing seats, and prestressing means mounted between said first and second bearing seats.

2. The apparatus of claim 1 wherein said bearing housing includes a third bearing supporting said rotary shaft for carrying axial forces from said at least one of said first and second opposed refining disks, and including a third bearing seat axially movable within said bearing housing, said third bearing being rigidly mounted in said third bearing seat, said prestressing means comprising first prestressing means, and including second prestressing means mounted between said second and third bearing seats.

3. The apparatus of claim 2 including at least one additional bearing supporting said rotary shaft for carrying only axial forces from said at least one of said first and second opposed refining disks, and at least one additional bearing seat located between said first and second bearing seats.

4. The apparatus of claim 2 wherein each of said first, second and third bearing seats includes first, second and third annular hydraulic cylinders, and including first, second and third piston means mounted with respect to said first, second and third annular hydraulic cylinders and rigidly connected to said bearing housing, wherein said first, second and third bearing seats are axially movable by supplying a hydraulic medium to said first, second and third annular hydraulic cylinders through said first, second and third piston means.

5. The apparatus of claim 4 wherein said first and third annular hydraulic cylinders are dimensioned for distributing the axial forces between said first and third bearings.

6. The apparatus of claim 1 wherein each of said first and second bearing seats includes first and second annular hydraulic cylinders, and including first and second piston means mounted with respect to said first and second annular hydraulic cylinders and rigidly connected to said bearing housing, wherein said first and second bearing seats are axially movable by supplying a hydraulic medium to said first and second annular hydraulic cylinders through said first and second piston means.

7. The apparatus of claim 6 wherein said piston means comprises ring pistons.

8. The apparatus of claim 6 including first and second conduit means for supplying said hydraulic medium to said first and second annular hydraulic cylinders.

9. The apparatus of 1 wherein said prestressing means comprises a prestressing cylinder, and including an associated prestressing piston located within said prestressing cylinder, and spring means adapted to springedly separate said prestressing piston from said prestressing cylinder.

10. The apparatus of claim 9 wherein each of said first and second bearing seats includes first and second annular hydraulic cylinders, and including first and second piston means mounted with respect to said first and second annular hydraulic cylinder and rigidly connected to said bearing housing, wherein said first and second bearing seats are axially movable by supplying hydraulic medium to said first and second annular hydraulic cylinders through said first and second piston means.

11. The apparatus of 10 wherein at least one of said prestressing cylinders communicates with at least one of said first and second annular hydraulic cylinders whereby the pressure in said at least one of said first and second annular hydraulic cylinders counteracts the prestressing in said prestressing means.

* * * * *

UNITED STATES PATENT AND TRADEMARK OFFICE
CERTIFICATE OF CORRECTION

PATENT NO. : 5,472,285

DATED : December 5, 1995

INVENTOR(S) : Olof Kjellqvist

It is certified that error appears in the above-indentified patent and that said Letters Patent is hereby corrected as shown below:

The title page, showing an illustrative figure, should be deleted and substitute therefor the attached title page.

Delete columns 1 - 6, and substitute therefor the sheets, consisting of columns 1 - 6, as shown on the attached pages.

Signed and Sealed this

Twenty-sixth Day of March, 1996

Attest:

BRUCE LEHMAN

Attesting Officer

Commissioner of Patents and Trademarks

United States Patent [19]
Kjellqvist

[11] Patent Number: 5,472,285
[45] Date of Patent: Dec. 5, 1995

[54] APPARATUS FOR REFINING FIBER MATERIAL

[75] Inventor: Olof Kjellqvist, Sundsvall, Sweden

[73] Assignee: Sunds Defibrator Industries Aktiebolag, Sweden

[21] Appl. No.: 331,652
[22] PCT Filed: Apr. 21, 1993
[86] PCT No.: PCT/SE93/00344
  § 371 Date: Nov. 8, 1994
  § 102(e) Date: Nov. 8, 1994
[87] PCT Pub. No.: WO93/23166
  PCT Pub. Date: Nov. 25, 1993

[30] Foreign Application Priority Data

May 8, 1992 [SE] Sweden ............... 9201448-9

[51] Int. Cl.⁶ .......................... F16C 19/38
[52] U.S. Cl. .................. 384/556; 384/563; 384/99
[58] Field of Search ................ 384/556, 563, 384/99, 571, 517; 241/37

[56] References Cited

U.S. PATENT DOCUMENTS

| | | |
|---|---|---|
| 2,565,759 | 8/1951 | Danley et al. ............... 384/556 |
| 3,304,139 | 2/1967 | Toth et al. ................... 384/556 |
| 4,341,426 | 7/1982 | Clapp ........................... 384/556 |
| 4,923,313 | 5/1989 | Bergling. | |
| 5,323,972 | 6/1994 | Kjellqvist ..................... 384/121 |

FOREIGN PATENT DOCUMENTS

345892 6/1972 Sweden.

Primary Examiner—Lenard A. Footland
Attorney, Agent, or Firm—Lerner, David, Littenberg, Krumholz & Mentlik

[57] ABSTRACT

Apparatus for refining fibrous material comprising first and second opposed refining disks, at least one of said first and second opposed refining disks being rotatable, a rotary shaft for rotatably mounting said at least one of said first and second opposed refining disks, a bearing housing for mounting said rotary shaft, a stand for stationary mounting of said bearing housing, said bearing housing including first and second bearings supporting said rotary shaft, said first bearing for at least carrying axial forces from said at least one of said first and second opposed refining disks and said second bearing for at least carrying radial forces therein, first and second bearing seats axially movable within said bearing housing, each of said first and second bearings being rigidly mounted in said first and second bearing seats, and prestressing structure mounted between said first and second bearing seats.

11 Claims, 3 Drawing Sheets

APPARATUS FOR REFINING FIBER MATERIAL

FIELD OF THE INVENTION

The present invention relates to apparatus for the refining of fiber material. The present invention also relates to a so-called disk refiner, which comprises two opposed refining disks, at least one of which is rotary and supported on a rotary shaft.

BACKGROUND OF THE INVENTION

In a disk refiner of the type which includes two opposed refining disks, at least one of which is rotary, the shaft is mounted in a stand by means of a bearing housing comprising at least two bearings.

A disk refiner equipped with such a bearing type is disclosed in SE-PS 345 892. The bearing is relatively complicated, because it comprises a bearing housing for the bearings which is axially movable in the refiner stand. The bearing housing must therefore be extensive in length, and include several slide surfaces to be fitted into the stand. The bearings, furthermore, must be axially prestressed in such a way, that at least one bearing must carry a radial load and must simultaneously be axially movable in the bearing housing. This compromise renders a complicated and more expensive structure, and causes a deterioration of its functional efficiency.

SUMMARY OF THE INVENTION

In accordance with the present invention, a solution to the aforementioned problems results from the invention of apparatus for refining fibrous material comprising first and second opposed refining disks, at least one of said first and second opposed refining disks being rotatable, a rotary shaft for rotatably mounting the rotatable refining disk, a bearing housing for mounting the rotary shaft, a stand for stationary mounting of the bearing housing, the bearing housing including first and second bearings supporting the rotary shaft, the first bearing for at least carrying axial forces from the rotatable disk and the second bearing for at least carrying radial forces therein, first and second bearing seats axially movable within the bearing housing, each of the first and second bearings being rigidly mounted in the first and second bearing seats, and prestressing means mounted between the first and second bearing seats.

In accordance with one embodiment of the apparatus of the present invention, the bearing housing includes a third bearing supporting the rotary shaft for carrying axial forces from the rotatable disk, and including a third bearing seat axially movable within the bearing housing, the third bearing being rigidly mounted in the third bearing seat, the prestressing means comprising first prestressing means, and including second prestressing means mounted between the second and third bearing seats.

In accordance with another embodiment of the apparatus of the present invention, each of the first and second bearing seats includes first and second annular hydraulic cylinders, and the apparatus includes first and second piston means mounted with respect to the first and second annular hydraulic cylinders and rigidly connected to the bearing housing, wherein the first and second bearing seats are axially movable by supplying a hydraulic medium to the first and second annular hydraulic cylinders through the first and second piston means. In a preferred embodiment, the piston means comprises ring pistons. Preferably, the apparatus includes first and second conduit means for supplying the hydraulic medium to the first and second annular hydraulic cylinders.

In accordance with another embodiment of the apparatus of the present invention, the prestressing means comprises a prestressing cylinder and the apparatus includes an associated prestressing piston located within the prestressing cylinder, and spring means adapted to springedly separate the prestressing piston from the prestressing cylinder.

In a preferred embodiment, each of the first and second bearing seats includes first and second annular hydraulic cylinders, and the apparatus includes first and second piston means mounted with respect to the first and second annular hydraulic cylinder and rigidly connected to the bearing housing, wherein the first and second bearing seats are axially movable by supplying hydraulic medium to the first and second annular hydraulic cylinders through the first and second piston means.

In a preferred embodiment, at least one of the prestressing cylinders communicates with at least one of the first and second annular hydraulic cylinders whereby the pressure in the at least one of the first and second annular hydraulic cylinders counteracts the prestressing in the prestressing means.

In accordance with this invention, since the bearing housing is fixed in the stand, and the bearings are rigidly mounted each in their axially movable bearing seats, and prestressing members are arranged between the bearing seats, a simple and operationally reliable structure is obtained.

BRIEF DESCRIPTION OF THE DRAWINGS

The present invention may be more readily appreciated with reference to the following detailed descriptions, in which reference is made to the Figures, in which.

DETAILED DESCRIPTION

Both embodiments of the present invention shown in the Figures consist of a refiner with a stand 1 and a refiner housing 2, in which two opposed refining disks 3, 4 are located. In these embodiments, a first refining disk 3 is rotary, and a second refining disk 4 is stationary. The rotary refining disk 3 is supported on a rotary shaft 5, which is mounted in the stand 1 by means of a bearing housing 6 and driven by a motor (not shown).

The refining disks 3, 4 are provided on their surfaces facing toward each other with refining elements 7, 8, which between themselves define a refining gap. The stationary refining disk 4 has a central inlet opening 9, through which the material is fed which is to be refined during its passage outward through the refining gap.

During the refining operation, a very high pressure is generated in the refining gap, which pressure yields an axial force which has to be removed by the bearing of the shaft. This force can amount to several tens of tons and, therefore, puts very high requirements on the bearing design.

The rotary shaft 5 is also movable so as to allow adjustment of the refining gap between the refining elements 7, 8 on the refining disks 3, 4.

According to the embodiment shown in FIG. 1, the shaft 5 is supported by two bearings 11, 12. The first bearing 11 is an axial/radial bearing intended to carry axial forces from the first refining disk 3. This bearing 11 also carries prevailing radial forces, for example the dead weight of the shaft and refining disk. The second bearing 12 is an axial/radial bearing intended primarily to carry radial forces, for example counter forces to the radial forces on the first bearing.

The bearing housing 6 is mounted rigidly in the stand 1. The two bearings 11, 12 are attached with their inner ring on the shaft 5 and with their outer ring are fixed in first and second bearing seats 21, 22, respectively. These bearing seats are axially movable by means of a slip fit, but are not rotary in the bearing housing 6. In the stationary bearing housing 6, a plurality of first prestressing members 25 are arranged between the two bearing seats 21, 22. Each prestressing member 25 is preferably designed as a spring-loaded piston/cylinder unit, the object of which is to keep apart the bearing seats 21, 22 so as to prevent play therebetween.

The axial movement of the bearing seats 21, 22 is controlled by first and second ring pistons 41, 42, respectively, which are rigidly connected to the bearing housing 6 and thereby cooperate with first and second annular hydraulic cylinders 31, 32, respectively, in the first and second bearing seats 21, 22, respectively. The first ring piston/ring cylinder unit 41, 31 is intended to move the first bearing seat 21 so as to reduce the refining gap. This implies that the axial forces generated in the refining gap are to be taken up by the first ring piston/ring cylinder unit 41, 31. The second ring piston/ring cylinder unit 42, 32 is intended to act in the opposite direction and, thus, is utilized when the refining disks are to be pulled apart.

First and second conduits 51, 52, respectively, for hydraulic medium are arranged for operating the two ring piston/ring cylinder units 41, 42 and 31, 32. These conduits extend through the stand 1 by means of the bearing housing 6 and respective ring piston 41, 42 to respective ring cylinder 31, 32.

In view of this design, the two bearing seats 21, 22 with associated bearings 11, 12 can rapidly and safely be operated as one unit by means of the hydraulic medium in the two conduits 51, 52. Simultaneously, the axial forces from the first refining disk 3 are transferred through the bearing 11 and bearing seat 21 to the stationary bearing housing 6.

The embodiment according to FIG. 2 operates upon the same principle as that of FIG. 1. A distinguishing feature is that the shaft 5 is supported on three bearings 11, 12 and 13. The first bearing 11 is an axial/radial bearing intended to carry part of the axial forces from the first refining disk 3. As in the case of the first embodiment, the bearing 11 also carries prevailing radial forces. The second bearing 12 is an axial/radial bearing intended primarily to carry radial forces. The third bearing 13 is located between the first two bearings, and is arranged to carry only axial forces. The bearing 13, however, is preferably an axial/radial bearing.

The third bearing 13 is attached with its inner ring on the shaft 5 and with its outer ring secured in a third bearing seat 23. This third bearing seat 23 is axially movable with a certain play in the bearing housing 6. According to this embodiment, a plurality of second and third prestressing members 26, 27, respectively, are located between the first and third bearing seat 21, 23 and between the second and third bearing seats 22, 23, respectively. The prestressing members preferably are designed as spring-loaded piston/cylinder units and are capable of keeping the bearing seats 21, 22, 23 apart from each other in order to avoid play. The collective force form the third prestressing members 27 shall exceed the collective force from the second prestressing members 26.

The third bearing seat 23 is formed with a third annular hydraulic cylinder 33, which cooperates with a third ring piston 43 rigidly connected with the bearing housing 6. The third ring piston/ring cylinder 43, 33 is moved by means of a hydraulic medium by means of a third supply conduit 53. The third ring piston/ring cylinder unit 43, 33 is further arranged to cooperate with the first ring piston/ring cylinder unit 41, 31 in order to take up axial forces from the first refining disk 3.

The distribution of the axial forces from the first and third bearing 11, 13 is determined by the ratio between the areas in the first and third ring cylinder 31, 33 by maintaining the same pressure in respective conduits 51 and 53. The load distribution is thus directly proportional to the ratio of the areas. The third bearing 13 does not carry any radial forces, because the bearing seat 23 is located with play in the bearing housing 6. As the first bearing 11 carries also radial forces, it may be suitable to design the third ring cylinder 33 with a slightly greater area than the first ring cylinder 31, so that the axial load on the third bearing is slightly greater.

It is, of course, possible to arrange additional bearings between the first and second bearing 11, 12. These additional bearings with associated bearing seats then, like the third bearing, shall carry only axial forces, which are distributed in proportion to the area of the respective ring piston/ring cylinder unit. Prestressing members between the bearing seats are arranged as described above.

The bearing detail according to FIG. 2 as shown in FIG. 3 comprises the two bearing seats 22, 23 and one prestressing member 27. According to this embodiment, the prestressing members 27 are formed with a piston/piston rod 61, the rear end 62 of which abuts the bearing seat 22, and whose forward end is axially movable in a cylinder 63. Between the rear end 62 of the piston rod and the cylinder 63, a prestressed spring package 64 is located which tends to press apart the piston/piston rod 61 and cylinder 63, and therewith also the bearing seats 22 and 23, so that play in the bearings 12, 13 is avoided. The remaining prestressing members 25, 26 are designed and operate correspondingly. This operational function is essential when the first refining disk 3 is moved axially towards the second refining disk 4 for adjusting the refining gap before the production is started, because the pressure in the ring cylinders 31, 33 is very low.

At the start of production, the pressure in the ring cylinders 31, 33 increases in order to counteract the axial forces generated in the refining gap, as described above. The prestressing members 25, 26, and 27 in this phase deliver only a minor force to the second (rear)

bearing 12. It is, therefore, possible to arrange a relief of at least some of the prestressing members 25, 26 and 27 in each group. FIG. 4 shows how such a relief can be provided. FIG. 4 shows the same detail of the bearing as in FIG. 3, but in this case the prestressing member 27 is designed differently. A piston rod 65 abuts the bearing seat 22 with its read end 66. The forward end of the piston rod is formed with a piston 67, which is axially movable in a cylinder 68. Between the rear end 66 of the piston rod and the cylinder 68, a prestressed spring package 64 is located. The cylinder 68 communicates by means of a channel 69 with the space in the ring cylinder 33 in front of the ring piston 42. With increasing pressure in the ring cylinder 33, the pressure in the cylinder 68 increases simultaneously, and thereby counteracts the force of the spring package 64. The remaining prestressing members 25, 26, of course, can be designed in a corresponding manner, thereby avoiding unnecessary axial load on the bearings during operation. As regards the embodiment according to FIG. 2, the collective force from the prestressing members 27 shall at all times exceed the collective force from the prestressing members 26.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. Apparatus for refining fibrous material comprising first and second opposed refining disks, at least one of said first and second opposed refining disks being rotatable, a rotary shaft for rotatably mounting said at least one of said first and second opposed refining disks, a bearing housing for mounting said rotary shaft, a stand for stationary mounting of said bearing housing, said bearing housing including first and second bearings supporting said rotary shaft, said first bearing for at least carrying axial forces from said at least one of said first and second opposed refining disks and said second bearing for at least carrying radial forces therein, first and second bearing seats axially movable within said bearing housing, each of said first and second bearings being rigidly mounted in said first and second bearing seats, and prestressing means mounted between said first and second bearing seats.

2. The apparatus of claim 1 wherein said bearing housing includes a third bearing supporting said rotary shaft for carrying axial forces from said at least one of said first and second opposed refining disks, and including a third bearing seat axially movable within said bearing housing, said third bearing being rigidly mounted in said third bearing seat, said prestressing means comprising first prestressing means, and including second prestressing means mounted between said second and third bearing seats.

3. The apparatus of claim 2 including at least one additional bearing supporting said rotary shaft for carrying only axial forces from said at least one of said first and second opposed refining disks, and at least one additional bearing seat located between said first and second bearing seats.

4. The apparatus of claim 2 wherein each of said first, second and third bearing seats includes first, second and third annular hydraulic cylinders, and including first, second and third piston means mounted with respect to said first, second and third annular hydraulic cylinders and rigidly connected to said bearing housing, wherein said first, second and third bearing seats are axially movable by supplying a hydraulic medium to said first, second and third annular hydraulic cylinders through said first, second and third piston means.

5. The apparatus of claim 4 wherein said first and third annular hydraulic cylinders are dimensioned for distributing the axial forces between said first and third bearings.

6. The apparatus of claim 1 wherein each of said first and second bearing seats includes first and second annular hydraulic cylinders, and including first and second piston means mounted with respect to said first and second annular hydraulic cylinders and rigidly connected to said bearing housing, wherein said first and second bearing seats are axially movable by supplying a hydraulic medium to said first and second annular hydraulic cylinders through said first and second piston means.

7. The apparatus of claim 6 wherein said piston means comprises ring pistons.

8. The apparatus of claim 6 including first and second conduit means for supplying said hydraulic medium to said first and second annular hydraulic cylinders.

9. The apparatus of claim 1 wherein said prestressing means comprises a prestressing cylinder, and including an associated prestressing piston located within said prestressing cylinder, and spring means adapted to springedly separate said prestressing piston from said prestressing cylinder.

10. The apparatus of claim 9 wherein each of said first and second bearing seats includes first and second annular hydraulic cylinders, and including first and second piston means mounted with respect to said first and second annular hydraulic cylinder and rigidly connected to said bearing housing, wherein said first and second bearing seats are axially movable by supplying hydraulic medium to said first and second annular hydraulic cylinders through said first and second piston means.

11. The apparatus of claim 10 wherein at least one of said prestressing cylinders communicates with at least one of said first and second annular hydraulic cylinders whereby the pressure in said at least one of said first and second annular hydraulic cylinders counteracts the prestressing in said prestressing means.

* * * * *